(12) United States Patent
Bertoli (10) Patent No.: US 9,017,022 B2
(45) Date of Patent: Apr. 28, 2015

(54) SHELL FOR AIRCRAFT TURBO-ENGINE STATOR WITH MECHANICAL BLADE LOAD TRANSFER SLITS

(75) Inventor: Vincenzo Bertoli, Reggio Emilia (IT)

(73) Assignee: Snecma, Paris (FR)

( * ) Notice: Subject to any disclaimer, the term of this patent is extended or adjusted under 35 U.S.C. 154(b) by 719 days.

(21) Appl. No.: 13/266,916

(22) PCT Filed: May 4, 2010

(86) PCT No.: PCT/EP2010/055998
§ 371 (c)(1),
(2), (4) Date: Oct. 28, 2011

(87) PCT Pub. No.: WO2010/128025
PCT Pub. Date: Nov. 11, 2010

(65) Prior Publication Data
US 2012/0051938 A1    Mar. 1, 2012

(30) Foreign Application Priority Data

May 7, 2009 (FR) .................................... 09 53055

(51) Int. Cl.
| | | |
|---|---|---|
| *F01D 9/04* | (2006.01) | |
| *F01D 5/22* | (2006.01) | |
| *F04D 29/54* | (2006.01) | |

(52) U.S. Cl.
CPC .............. *F01D 9/041* (2013.01); *F01D 9/044* (2013.01); *F01D 5/225* (2013.01); *F01D 9/04* (2013.01); *F04D 29/542* (2013.01); *F05D 2240/122* (2013.01); *F05D 2240/304* (2013.01); *F05D 2260/94* (2013.01); *F05D 2260/941* (2013.01); *Y02T 50/671* (2013.01); *F05D 2230/642* (2013.01); *F05D 2270/114* (2013.01)

(58) Field of Classification Search
CPC ............ F01D 9/041; F01D 9/044; F01D 9/04
USPC ............ 416/214 R, 214 A, 219 R; 415/209.3, 415/209.4, 210.1, 191, 211.2
See application file for complete search history.

(56) References Cited

U.S. PATENT DOCUMENTS 3,950,113 A * 4/1976 Albrecht ..................... 416/97 A
6,290,466 B1 * 9/2001 Ravenhall et al. ......... 416/229 A
(Continued)

FOREIGN PATENT DOCUMENTS

| DE | 10 2007 050 916 | 4/2008 |
| EP | 1 724 443 | 11/2006 |
| WO | 2008 111957 | 9/2008 |

OTHER PUBLICATIONS

International Search Report Issued Jul. 20, 2010 in PCT/EP10/055998 filed May 4, 2010.

*Primary Examiner* — Nathaniel Wiehe
*Assistant Examiner* — Kayla McCaffrey
(74) *Attorney, Agent, or Firm* — Oblon, McClelland, Maier & Neustadt, L.L.P.

(57) ABSTRACT

A shell of a stator for a module of an aircraft turbo-engine including a plurality of through openings each configured to house a stator blade, each opening forming a skeleton extending between a first end configured to house the trailing edge of the blade and a second end configured to house the leading edge of the blade. At least one of the openings is associated with a mechanical load transfer slit passing through the shell, and arranged facing and at a distance from the first end of the opening along the direction of the skeleton.

16 Claims, 5 Drawing Sheets

(56) References Cited

U.S. PATENT DOCUMENTS

| | | | |
|---|---|---|---|
| 6,478,537 B2 * | 11/2002 | Junkin | 415/173.1 |
| 7,458,779 B2 * | 12/2008 | Bil et al. | 416/190 |
| 7,597,536 B1 * | 10/2009 | Liang | 415/138 |
| 8,177,502 B2 * | 5/2012 | Headley et al. | 415/209.3 |
| 2009/0000306 A1 | 1/2009 | Damle et al. | |
| 2010/0028146 A1 | 2/2010 | Martin et al. | |

* cited by examiner

SHELL FOR AIRCRAFT TURBO-ENGINE STATOR WITH MECHANICAL BLADE LOAD TRANSFER SLITS

This invention relates in general to an aircraft turbo-engine, preferably a turbojet or turboprop type.

More particularly, the invention relates to a part of a stator for a module of such a turbo-engine, this part comprising a plurality of stator blades and two concentric shells on which the blades are fixed and that will radially delimit a core engine flow passing through this turbo-engine, one shell delimiting the flow on the inside and the other on the outside.

The invention also relates to these core engine flow delimitation shells.

The outer shell normally comprises a plurality of openings at a circumferential spacing from each other and passing through the thickness of the usually metallic shell, to hold the stator blades that extend radially inwards from this outer shell.

Each opening houses the head of one of the stator blades, this head being fixed to the outer shell by welding in the opening concerned, extending continuously all around the blade head.

Similarly, the inner shell usually comprises a plurality of openings at a circumferential spacing from each other and passing through the shell, to hold the stator blades that extend radially outwards from this inner shell. Each opening houses the root of one of the stator blades, this root being fixed to the outer shell by welding in the opening concerned, extending continuously all around the blade root.

Although this design is widespread in the industry, it has the disadvantage that cracks frequently appear at the trailing edge of the blade head and/or the trailing head of the blade root.

The explanation for this phenomenon that shortens the life of stator blades is the presence of very high static loads at the trailing edge of the blade head and/or the blade root, such that the dynamic margin is too small, facilitating the development of cracks.

It is proposed to overcome this disadvantage by thickening the shells so as to reduce deformations during operation and therefore to reduce stresses applied at the trailing edges of blade heads and roots. However, this solution is extremely expensive in terms of cost and mass.

It was also proposed to thicken the blades, but this inevitably causes a disturbance to the airflow passing between them, with a negative direct result on the global performances of the turbo-engine.

Therefore, the purpose of the invention is to at least partially overcome the problem mentioned above that occurs with embodiments according to prior art.

To achieve this, the purpose of the invention is a shell for a stator of an aircraft turbo-engine module with several through openings, each of which will hold a stator blade, each opening defining a skeleton extending between a first end in which the trailing edge of the blade will fit, and a second end in which the leading edge of the blade will fit. According to the invention, a mechanical load transfer slit is formed passing through the shell in at least one of said openings, and is arranged facing and at a distance from said first end of the opening along the direction of said skeleton.

The proposed invention can globally reduce static loads at the portion of the leading edge of the blade that will cooperate with the opening fitted with such a mechanical load transfer slit, providing a dynamic margin and therefore strongly slowing the appearance of cracks. Thus, during deformation of the shell in operation, the highly loaded zone is transferred to the ends of the slit, namely at a distance from the trailing edge and within the shell that is easily capable of supporting this load.

The solution provided is very satisfactory in that it does not cause any penalty in terms of mass, cost or performance. It also extends the life of the blades, advantageously implying that intervals between inspections and maintenance operations can be increased.

Naturally, this specific feature may be applied to all stator blades or it may be restricted to some specific blades, depending on the needs and constraints encountered. As an example, in the case in which the shell according to the invention is sectorised, it has been found judicious to associate such a mechanical load transfer slit solely for the two blades at the ends of each shell sector. Nevertheless, any other configuration could be envisaged without going outside the scope of the invention.

Manufacturing of mechanical load transfer slits only slightly extends the shell manufacturing process, because the slits can be machined at the same time as the openings. Moreover, it is advantageously possible to make such slits on existing shells.

Finally, it is noted that the shell according to the invention is preferably applicable to the outer radial delimitation shell of the core engine flow, in other words the stator shell on which the largest deformation occurs during operation under the effect of displacements of turbo-engine casings. Note that the main deformation of the outer shell, and also the inner shell to a lesser degree, is characterised by its diameter that increases towards the aft end, globally transforming its cylinder shape into a truncated cone shape.

Preferably, said slit extends along a curved line towards the opening, possibly extending around part of the opening.

Preferably, said opening presents an intrados part and an extrados part on each side of the skeleton that come together at said first and second ends of the opening, and said slit also extends facing and at a distance from the portions of the intrados and extrados parts that come together at said first end of the opening. The slit can extend around the rear part of the opening at an approximately constant distance from it.

Preferably, said slit has a generally U or V shape and said first end of the opening is located inside the hollow of the U or V to improve load transfer from the trailing edge of the blade.

Preferably, said slit is filled in by an infill material. The main function required by placement of this material is a leak tight airflow passing through the stator blades, but also to limit heat losses. Thus, either this slit may remain hollow or it may be filled in by said infill material, although it applies zero or negligible mechanical support.

For example, it could be an abradable type infill material, for example a silicone rubber compound resistant to temperature variations and containing balls.

Preferably, the shell forms a continuous approximately annular structure, preferably made from a single part. Alternately, it is made by placement of angular shell sectors end to end.

Another purpose of the invention is a stator part for an aircraft turbo-engine module comprising at least one shell like that presented above, and a plurality of stator blades.

Preferably, said shell is an outer shell and each of through openings contains the head of one of said blades, fixed to the outer shell by a weld formed in its opening and extending continuously all around the blade head. Thus, this solution confers satisfactory support of the blade head in the opening due to the continuous weld, and avoids the trailing edge of this blade head becoming overloaded by placing a mechanical load transfer slit specific to this invention at a distance from this trailing edge.

This specific feature is simultaneously or alternatively applicable to the inner shell of the stator part that also comprises an inner shell provided with several through openings, each of which contains the root of one of said blades fixed to the inner shell by a weld formed in its opening and extending continuously all around the blade root. Therefore a mechanical load transfer slit may be associated with one or several of these openings in the inner shell.

Another purpose of the invention is an aircraft turbo-engine module comprising at least part of a stator as described above, the module preferably being a compressor and even more preferably a high pressure compressor, but alternatively possibly being a turbine without going outside the scope of the invention.

Finally, another purpose of the invention is a turbo-engine for an aircraft comprising at least one module like that described above, the turbo-engine preferably being a turbojet.

Other advantages and characteristics of the invention will become clear in the non-limitative detailed description given below.

This description will be made with reference to the appended drawings among which.

Figure 1:
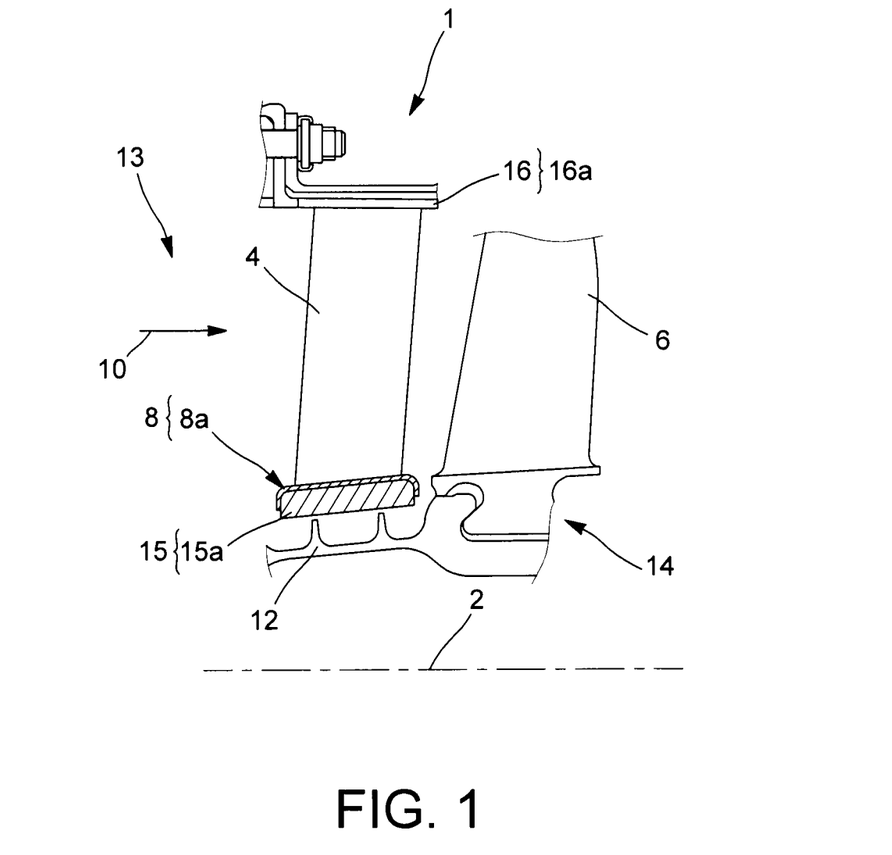
FIG. 1 shows a partial diagrammatic half-sectional view of a high pressure compressor for a turbo-engine according to a preferred embodiment of this invention.

Firstly, FIG. 1 shows a part of a high pressure compressor 1 for a turbo-engine according to a preferred embodiment of this invention. In a known manner, the compressor comprises alternating stator blades 4 and rotor blades 6 along an axial direction parallel to the compressor axis 2. The stator blades 4 are distributed circumferentially around the axis 2 and are integrated into a stator part 13 also according to the invention, also comprising an inner shell 8 forming the radially internal delimitation of an annular core engine flow 10 passing through the turbo-engine, this shell 8 supporting the blade roots passing through it. It also contains an outer shell 16 forming the radially external delimitation of the annular core engine flow 10, that supports the blade heads that pass through it.

In this respect, note that the stator part also comprises additional known elements added onto the shell 8, such as an abradable radially inner coating 15 forming an annular sealing track, contacted by a sealing device 12 carried by the rotor stage 14 carrying the rotating blades 6 and arranged downstream from the stator part concerned. As mentioned above, the rotating sealing device 12 is a known labyrinth or lip type seal.

Figure 2:
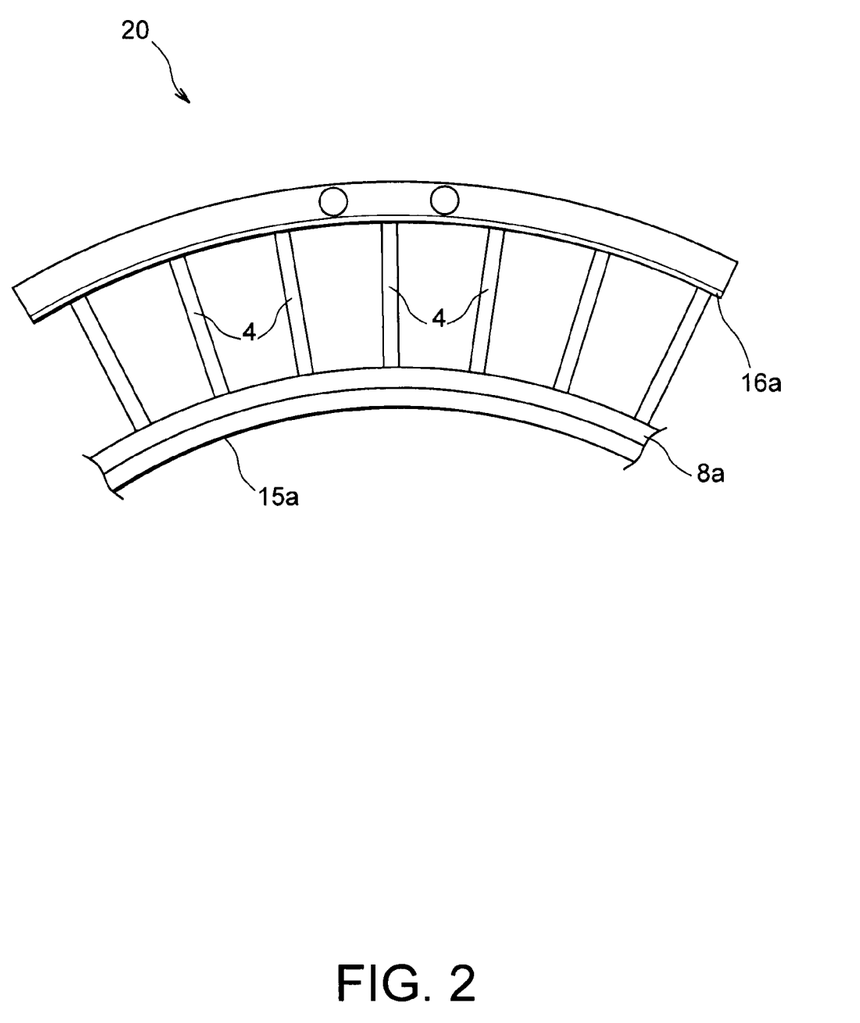
FIG. 2 shows a front view of an assembly forming an angular portion of the part of the compressor stator shown in FIG. 1.

In the described preferred embodiment, the stator part 13 forms an approximately annular structure with axis 2, and is preferably composed by placement of a plurality of assemblies 20 like that shown in FIG. 2, each forming an angular or circumferential portion of this stator part. As can be seen in this figure, each assembly 20 comprises an angular inner shell sector 8a with a plurality of stator blades 4, the inner shell 8 resulting from the end to end placement of all sectors 8a.

Therefore, in the segmented configuration shown, the angular sectors 8a (only one is shown in FIG. 2) jointly forming the shell 8 preferably have no direct rigid mechanical connections connecting them to each other, their adjacent ends simply being placed facing each other, with or without a clearance.

The segmentation made for the shell 8 is also adopted in exactly the same way for the abradable radially inner coating 15 forming the annular sealing track, and therefore only one angular sector 15a of this coating is supported by and fixed on the shell sector 8a.

Similarly, the assembly 20 comprises an outer shell angular sector 16a supporting the plurality of stator blades 4, therefore the outer shell 16 is formed by placement of all the sectors 16a. Therefore once again, the angular sectors 16a (only one of which is shown in FIG. 2) jointly forming the shell 16 preferably have no direct rigid mechanical connections connecting them to each other, their adjacent ends simply being placed facing each other, with or without clearance.

Since it is composed of end to end placement of several of these angular portions 16a, the stator part 13 adopts a so-called segmented design, unlike another design that is also envisaged said to be continuous, in which the shells 8 and 16 are each unique and continuous over 360°. One possible alternative is that one of the two shells 8 and 16 could be made of a single piece continuous over 360°, and the other shell could be sectorised.

For information, note that the number of assemblies/sectors 20 used to form the above-mentioned annular stator part 13 may be between 6 and 14, each assembly 20 preferably having the same angular/circumferential area.

Figure 3:
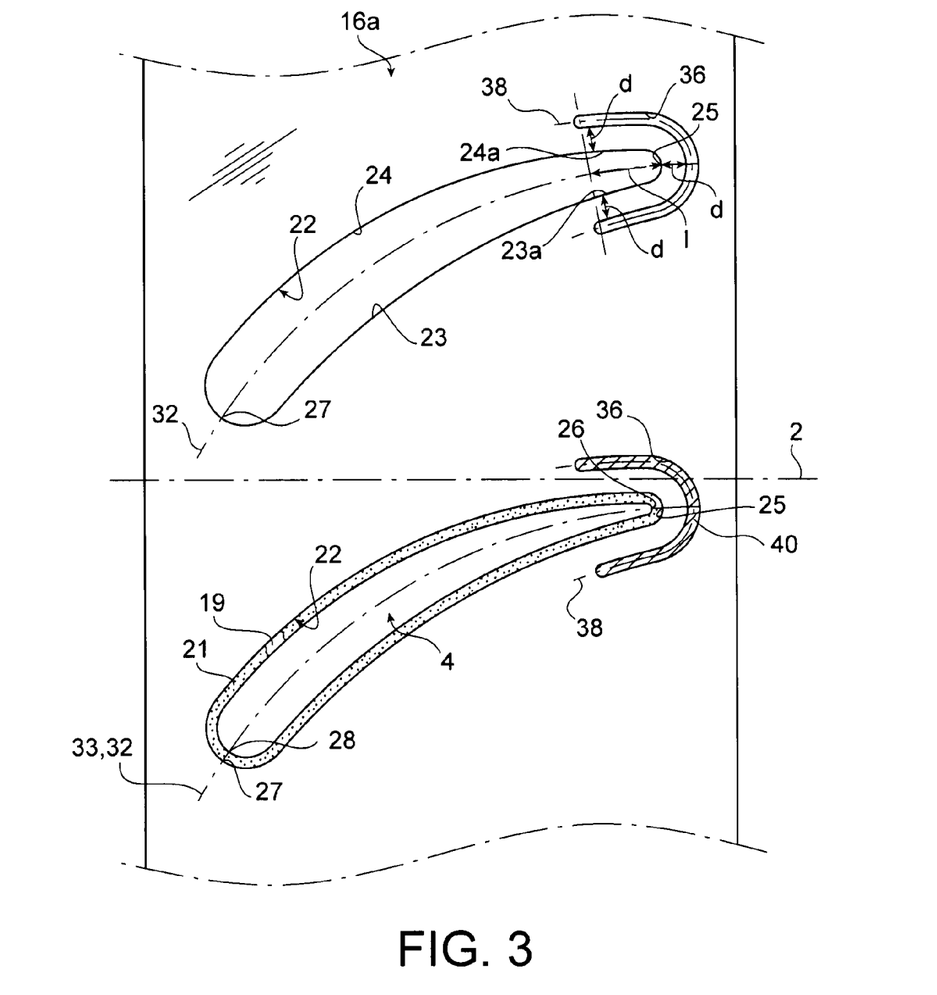
FIG. 3 shows a partial top view of the assembly shown in FIG. 2.

FIG. 3 shows that the angular sector of the outer shell 16a is fitted with openings 22 formed in the thickness of this sector 16a, such that they are through openings. For clarity of the description, the opening 22 visible at the top of FIG. 3 has been shown without its associated blade, unlike the opening shown at the bottom of this figure into which the head of its associated blade 4 fits. This head is rigidly fixed by a continuous weld 21 all round the blade head in the space 19 delimited between the sidewall of the opening 22 and the outer surface of the blade head.

Each opening 22 has a sidewall comprising an intrados part 23 and an extrados part 24 that come together at the forward end and at the aft end of the opening. The first end 25 of these two ends will house the trailing edge 26 of the blade head, while the second 27 will house the leading edge 28 of the blade head.

The intrados part 23 and the extrados part 24 define a skeleton 32 through which the two ends 25, 27 pass, corresponding in a known manner to the median line between the intrados part 23 and the extrados part 24. Furthermore, as shown on the bottom opening in FIG. 3, the skeleton 32 of the opening 22 is coincident with the skeleton 33 of the blade head fixed by the weld 21 in this opening, the opening and the blade head profiles being centred and homothetic.

One special feature of this invention is the formation of a mechanical load transfer slit 36 in association with at least one of the openings 22, that passes through the shell at a distance from the opening 22 concerned, in the aft direction. More precisely, the slit 36 is arranged facing and at a distance from the first end 25 of the opening along the direction of the skeleton 32, and is therefore at a distance from the trailing edge of the associated blade. In the embodiment shown, the slit 36 extends along a curved line 38 towards the opening, which extends around an aft part of the opening. In the figure, the slit 36 and the line 38 are generally U or V shaped, like a horseshoe inside which the aft part of the opening of formed, with the first end 25 facing and at a distance from the bottom of this U. In this respect, note that the distance "d" along the direction of the skeleton 32 between the end 25 of the opening and the slit 36 is between 0.02 and 0.1 times the total length, and more preferably between 0.03 and 0.05 times the total length (not referenced) of the blade head along this skeleton.

In this configuration, the two branches of the U also extend facing and at a distance from the portions 23a, 24a respectively of the intrados part 23 and the extrados part 24 that join together at the first end 25. The distance separating the two branches of the U from their associated opening portions 23a, 23b may be identical or similar to the distance "d", implying that the slit 36 extends around the rear part of the opening 22 at a distance from it that remains approximately constant.

Note that the branches of the U are approximately the same length, and that the aft part of the skeleton 32 is approximately an axis of symmetry for this U shaped slit 36.

The length "1" of the opening 22 along the direction of the skeleton 32 that penetrates into the open part of the U, is between 0.03 and 0.4 times the total length (not referenced), and preferably between 0.05 and 0.2 times the total length of the blade head 4 along this skeleton.

A first possibility would be to leave the mechanical load transfer slit 36 open, as is shown at the top of FIG. 3. Alternately, it could be filled with an infill material 40 that is designed largely to seal the core engine flow, namely to prevent leaks through the slit 36. Such an infill material is diagrammatically shown by reference 40 on the bottom slit in FIG. 3. For example, it could be an abradable type infill material, for example a silicone rubber compound resistant to temperature variations, and containing balls.

Although such a mechanical load transfer slit 36 is provided preferably only in association with the blades located at the two ends of the assembly 20, it would be quite possible to arrange otherwise without going outside the scope of the invention.

Furthermore, such blade mechanical load transfer slits 36 could also be provided in association with the through openings in the inner shell 8, into which the blade roots fit. The assembly would then be identical to or similar to that shown in FIG. 3 for the outer shell.

Figure 3A:
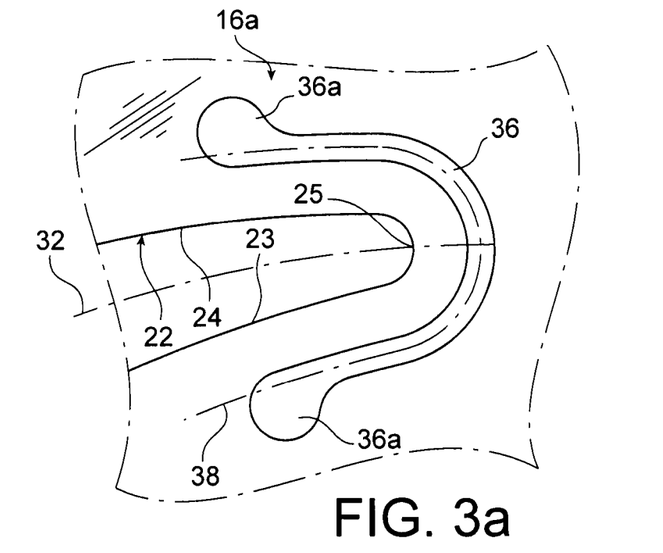
FIGS. 3a and 3b show alternative embodiments for the mechanical load transfer slits formed on the shell of the assembly shown in 3.

FIG. 3a shows a first alternative embodiment for the slit 36. It has a generally similar global shape to that described above, only its two ends 36a having been widened to reduce stresses in the shell at these slit ends. Thus, instead of having approximately the same width over its entire length, the slit 36 includes widened and rounded ends 36a, preferably arranged so as to move away from the opening 22 so as to orient stresses in a direction opposite to the direction of the blade.

Figure 3B:
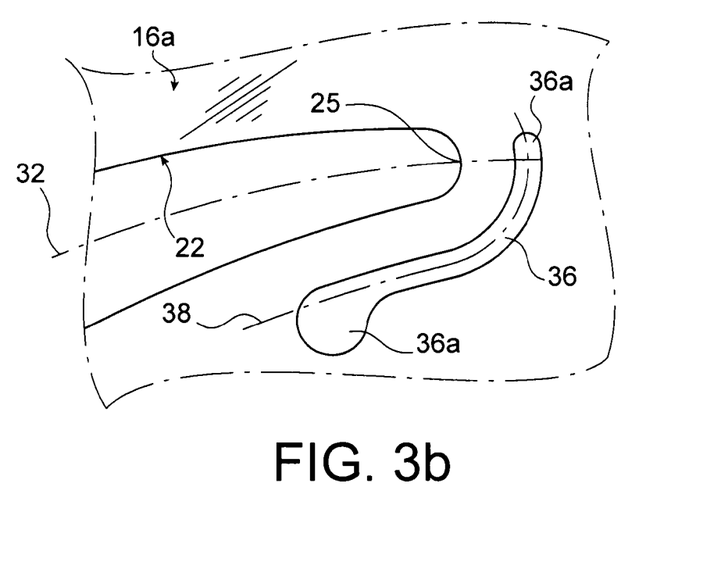

FIG. 3b shows another alternative embodiment in which the slit 36 corresponds to approximately half of the slit shown in FIG. 3a, therefore the skeleton 32 of the opening 22 passes through one of its ends 36a.

Figure 4A:
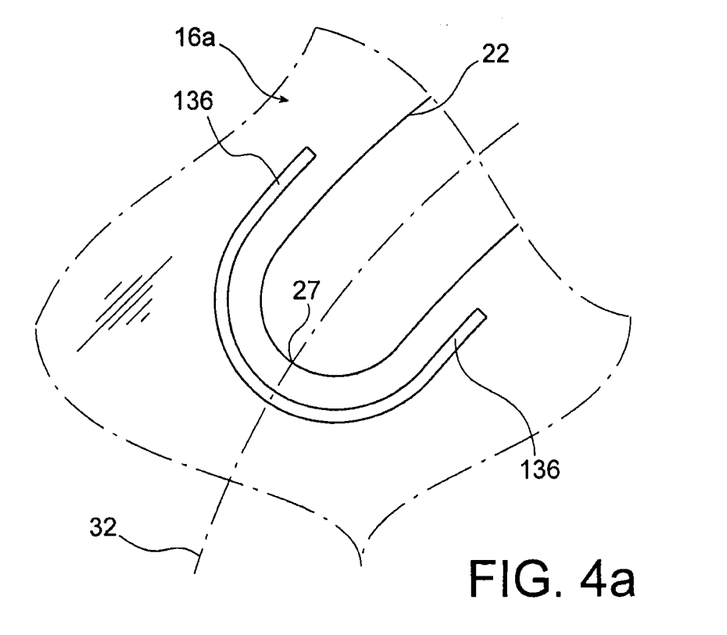
FIGS. 4a and 4b show example embodiments of additional mechanical load transfer slits formed on the shell of the assembly shown in FIG. 3.

Although such slits 36 are associated with the trailing edge due to a high static load in this blade portion, similar mechanical load transfer slits could also be associated with other parts of the blade that could also be highly loaded statically. For example, this is applicable for the leading edge of the blade, either at the root or the head of the blade. In such a case, an additional mechanical load transfer slit 136 shown in FIG. 4a could be formed passing through the shell, facing the second end 27 of the opening and at a distance from it along the direction of the skeleton 32. Such a slit 136 could then be in a form similar to the slits 36 described above, oriented in the direction of the opening 22 and penetrated by the forward part of this opening.

Figure 4B:
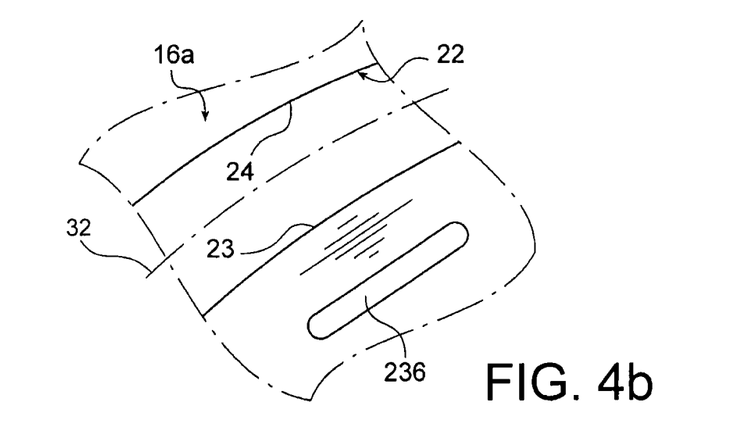

At the same time or alternately, there could be several mechanical load transfer slits 236 along the intrados portion 23 and/or the extrados portion 24 of the opening, at a distance from the portion concerned 23, 24, as shown in FIG. 4b.

Obviously, those skilled in the art could make various modifications to the invention as described above, solely as non-limitative examples.

The invention claimed is:

1. A shell for a stator of an aircraft turbo-engine module, comprising:
    a plurality of through openings each configured to house a stator blade, each stator blade having a trailing edge and a leading edge, each opening forming a skeleton extending between a first end configured to house the trailing edge of the blade and a second end configured to house the leading edge of the blade,
    a mechanical load transfer slit passing through the shell, said slit being associated with one of said openings and arranged facing and at a distance from the first end of the opening along the direction of the skeleton,
    wherein the slit has a generally horseshoe shape with a bottom portion and two branches extending from said bottom portion,
    wherein the first end of the opening is located between said branches of said slit, and
    wherein the slit is separated from said opening by a portion of said shell.

2. A shell according to claim 1, wherein the slit extends along a curved line towards the opening.

3. A shell according to claim 1, wherein the opening presents an intrados part and an extrados part on each side of the skeleton, that come together at the first and second ends of the opening, and wherein the slit also extends facing and at a distance from portions of the intrados and extrados parts that come together at the first end of the opening.

4. A shell according to claim 1, wherein the slit is filled in by an infill material.

5. A shell according to claim 1, forming a continuous approximately annular structure.

6. A shell according to claim 1, forming an approximately annular structure made by placement of angular shell sectors end to end.

7. A stator part for an aircraft turbo-engine module comprising:
    at least one shell according to claim 1; and
    a plurality of stator blades.

8. A stator part according to claim 7, wherein the shell is an outer shell, and each of the through openings houses a head of one of the blades, fixed to the outer shell by a weld arranged in its opening and extending continuously all around the head of the blade.

9. A stator part according to claim 8, further comprising an inner shell comprising a plurality of through openings each housing a root of one of the blades, fixed to the inner shell by a weld formed in its opening and extending continuously all around the blade root.

10. A module of an aircraft turbo-engine comprising at least a stator part according to claim 7.

11. A module according to claim 10, which is a compressor, or a high pressure compressor.

12. A turbo-engine for an aircraft, comprising at least one module according to claim 10.

13. A shell according to claim 1, wherein the slit is separated from said opening by a distance along the direction of said skeleton, said distance being between 0.02 and 0.1 times a total length of said blade along said skeleton.

14. A shell according to claim 13, wherein said distance is between 0.03 and 0.05 times the total length of said blade along said skeleton.

15. A shell according to claim 1, wherein the branches and the bottom portion of said slit are separated from said opening by a distance.

16. A shell according to claim 15, wherein the distance separating the branches and the bottom portion of said slit from said opening is approximately constant.

* * * * *